United States Patent [19]
Hagie et al.

[11] 4,197,694
[45] Apr. 15, 1980

[54] CROP HEIGHT SENSING ASSEMBLY FOR MECHANICAL DETASSELING DEVICES

[75] Inventors: Raymond W. Hagie; Kenneth A. Woodruff, both of Clarion, Iowa

[73] Assignee: Hagie Manufacturing Co., Clarion, Iowa

[21] Appl. No.: 945,081

[22] Filed: Sep. 25, 1978

[51] Int. Cl.² .......................................... A01D 75/28
[52] U.S. Cl. .......................................... 56/10.2; 56/51
[58] Field of Search .............................. 56/10.2, 51–63

[56] References Cited

U.S. PATENT DOCUMENTS

| | | | |
|---|---|---|---|
| 3,196,599 | 7/1965 | Meiners et al. | 56/10.2 |
| 3,524,308 | 8/1970 | Spry | 56/51 |
| 3,710,564 | 1/1973 | Sammann | 56/51 |
| 3,724,184 | 4/1973 | Wright | 56/51 |
| 3,769,782 | 11/1973 | Cler | 56/51 |
| 3,855,761 | 12/1974 | Louks et al. | 56/51 |
| 4,141,200 | 2/1979 | Johnson | 56/10.2 |

*Primary Examiner*—Russell R. Kinsey

*Attorney, Agent, or Firm*—Rudolph L. Lowell; G. Brian Pingel

[57] ABSTRACT

A crop height sensing assembly for use in a control system that automatically adjusts the depth or vertical elevation of a mechanical corn detasseling device in response to the height of a corn plant having a tassel with adjacent leaf portions. The detasseling device is adjustably carried on a portable frame for movement along a corn plant row, and the control system includes a hydraulic cylinder assembly for raising and lowering the detasseling device, and circuitry for actuating the cylinder assembly. The crop sensing assembly includes a rock shaft extended tranversely of the portable frame, a support for the sensing assembly carried on the frame forwardly of the detasseling device for movement therewith, a plurality of dependent sensor rods axially spaced on the rock shaft and rockable therewith in response to contact with the corn plant leaf portions, and a signal assembly responsive to the rockable movement of the shaft to produce a sensing signal for operating the actuating circuitry.

3 Claims, 6 Drawing Figures

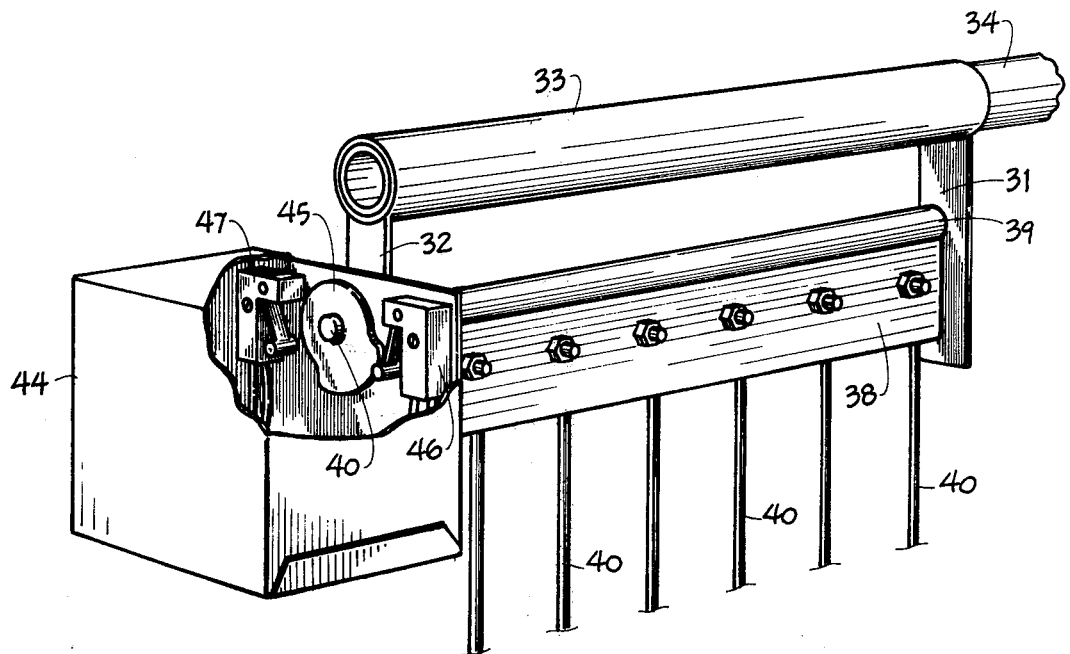
FIG. 4
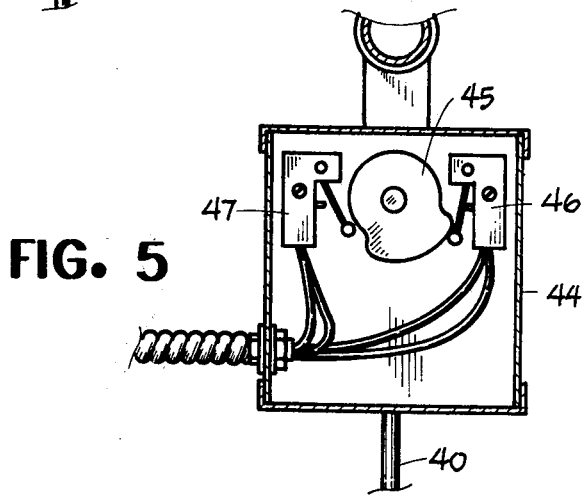
FIG. 5
FIG. 6
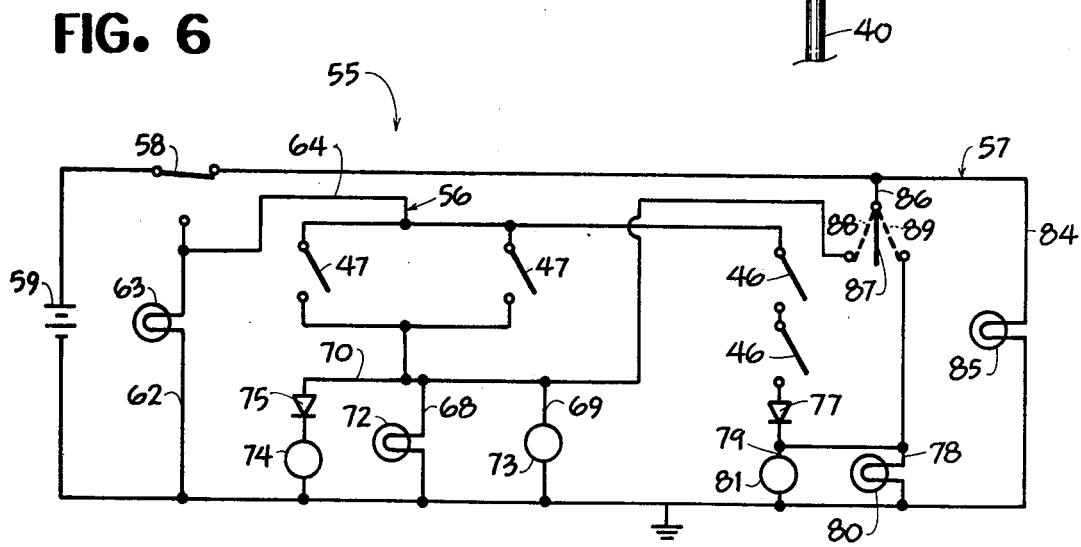

CROP HEIGHT SENSING ASSEMBLY FOR MECHANICAL DETASSELING DEVICES

BACKGROUND OF THE INVENTION

1. Field of the Invention

The present invention relates in general to mechanical devices for removing the tassels from corn plants, and more specifically, to a crop height sensing assembly for a control system that automatically adjusts the vertical position of such devices relative to the height of the corn plants being detasseled.

2. Description of the Prior Art

Various types of mechanical corn detasseling devices are known in the art, and these devices are becoming more common in replacing the manual removal of tassels. Although most mechanical detasselers operate satisfactorily in removing tassels when the corn plants are substantially uniform in height, many of them are ineffective to efficiently remove tassels from corn plants of varying heights.

The most common means presently employed for handling corn plants of varying heights comprise vertically adjustable detasseling devices that are powered for up or down movement in response to a manual control by the operator of the detasseling implement. However, the effectiveness of such manual control is directly dependent upon driving abilities and alertness of the operator. As a result, detasseling takes place at a reduced rate of the speed corresponding to the operator's reaction time in manually adjusting the detasseling devices.

Thus a need exists for an automatic detasseling apparatus that is vertically adjusted automatically relative to the varying heights of the corn plants encountered. To provide such an apparatus that is effective and efficient requires a sensor assembly that can readily sense the height of the corn plants and provide a sensing signal that is relative to the varying heights of the corn plants encountered. Canadian Pat. No. 778,092 discloses an automatic height adjusting control for a single bar of a combined for harvesting wheat, oats, barley and the like. Such control employs a number of sensing units with horizontally disposed sensor arms for engaging the crop at different heights to provide a crop height sensing signal. Although such sensing units appear to be satisfactory for the above mentioned crops that have a plurality of plants closely adjacent to one another, they do not provide satisfactory sensing of the height of corn plants that are individually aligned in relatively widely spaced apart rows.

SUMMARY OF THE INVENTION

The present invention provides a crop height sensing means that is adapted to operate by contacting the upper leaf or crown portion of a corn plant and produce a crop sensing signal in response thereto. The sensing means is employed in conjunction with a mechanical corn detasseling device that is carried on a portable frame and is vertically movable by a power means in response to the sensing signals provided by the crop sensing means.

The crop sensing means includes a rock shaft means extended transversely of the portable frame, means rotatably supporting the shaft means on the frame forwardly of the detasseling device, a plurality of dependent sensor rods on the shaft means, and signal means responsive to rockable movement of the shaft means to produce the crop sensing signal. The sensor rods depend from the shaft means and are axially spaced thereon to permit passage therebetween of the tassels of corn plants but providing for the lower portions of the rods contacting the crown leaf portion of the plants. As a result, the sensor rods are pivoted rearwardly and the rock shaft is rocked to provide a positive crop sensing signal, and reducing to a minimum spurious sensing signals.

BRIEF DESCRIPTION OF THE DRAWINGS

FIG. 4 is an enlarged perspective view of the crop height sensing assembly unit of present invention;

FIG. 5 is an enlarged sectional view taken on line 5—5 of FIG. 2; and

FIG. 6 is an electrical schematic diagram of the circuitry for the control system of FIG. 1.

DESCRIPTION OF THE PREFERRED EMBODIMENT

Figure 1:
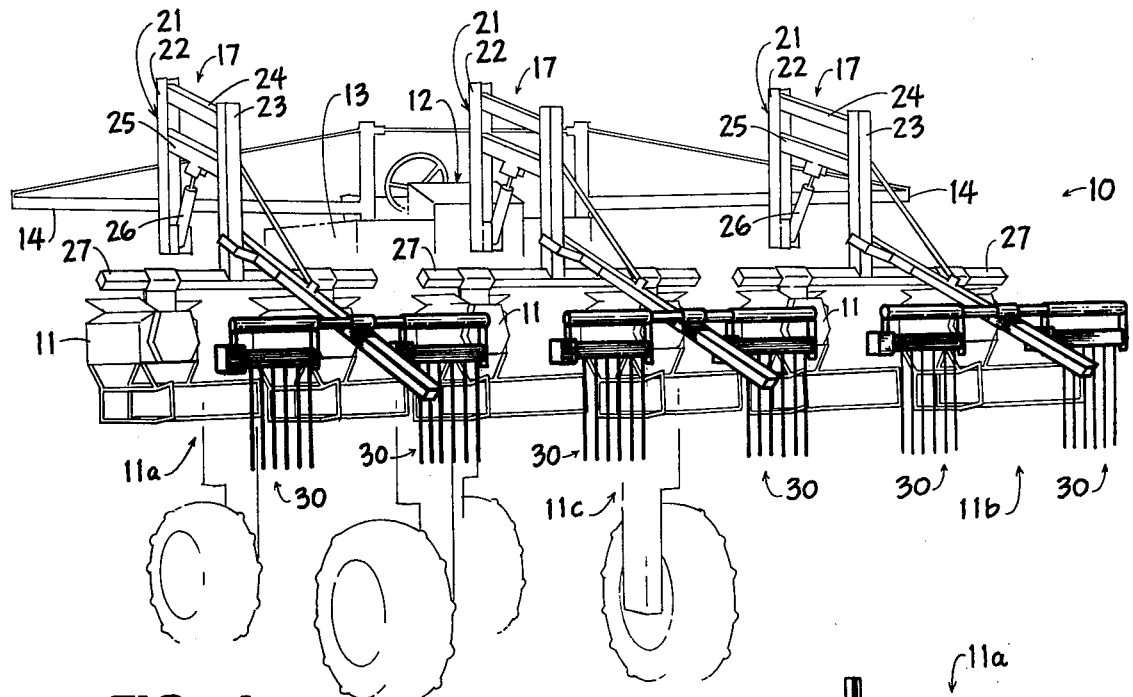
FIG. 1 is a front perspective view of a tractor having three pairs of corn detasseling devices mounted thereon and wherein a preferred embodiment of a control system with a crop height sensing assembly of the present invention is associated with each pair thereof.

The present invention provides a crop height sensing means that is particularly suitable for use in a control system that automatically controls the vertical position of a plurality of pairs of mechanical corn detasseling devices. Such control system is shown generally at 10, in FIG. 1, in assembly relation with three pairs of detasseling devices 11 each of which is of a standard roller type design readily obtainable through customary agricultural outlets. A tractor vehicle 12 which carries the detasseling devices 11, has an elevated body 13 to the front end of which are fixed transversely extended boom sections 14. The detasseling devices 11 are supported by pivotal support assemblies 17 in transversely spaced apart pairs, with a first pair 11a mounted from one end boom section 14, a second pair 11b mounted from the other end boom section 14, and a third pair 11c mounted from the front of the tractor body 13.

A support assembly 17 for a pair of detasseling devices 11a, 11b and 11c includes a parallel link system 21 having a pair of longitudinally spaced apart upright parallel links 22 and 23 that are pivotally connected together at their upper portions by an upper link 24 and approximately at their center portions by a lower link 25. The upright links 22 associated with the pairs of detasseling devices 11a and 11b are fixed to the boom sections 14, and the upright link 22 associated with the pair of devices 11c is fixed to the front of the tractor body 13. A hydraulic cylinder 26 is connected between each lower link 25 and upright link 22 for vertically adjusting the link systems 21.

Figure 2:
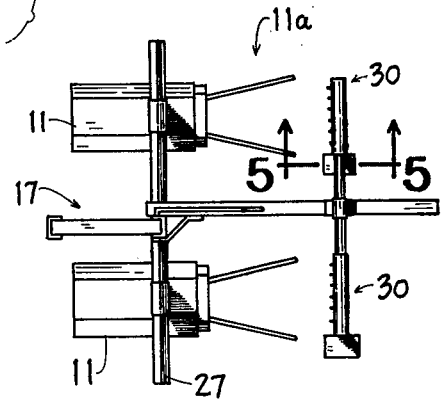
FIG. 2 is a plan view of a single pair of the corn detasseling devices and associated control system of FIG. 1.
Figure 3:
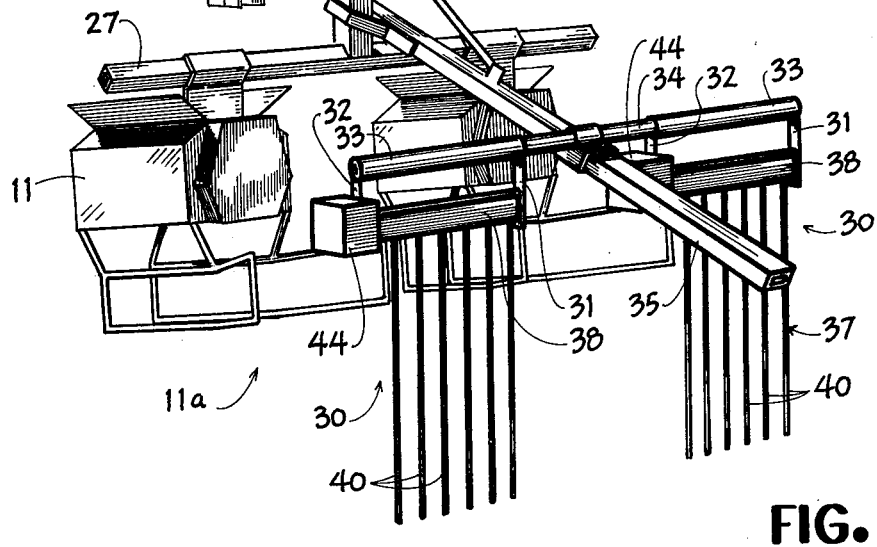
FIG. 3 is an enlarged perspective view of the detasseling devices and control system of FIG. 2.

Referring to FIGS. 2 and 3, each support assembly 17 also includes a mounting bar 27 that is fixed to the bottom end of the upright link 23 in parallel alignment with the boom sections 14. The pairs of detasseling devices 11a–11c are rigidly suspended by an associated mounting bar 27, which is raised or lowered by means of the hydraulic cylinder 26.

The control system 10 is adapted to provide an automatic adjustment of each of the hydraulic cylinders 26 in order that each pair of the detasseling devices 11a–11c is adjusted to a proper depth for contacting the tassels of corn plants in two adjacent rows of corn. The means included in the control system 10 for providing this operation is identical for each pair of the devices 11a–11c and, therefore, the construction and operation of the control system 10 will be described only with reference to the pair of detasseling devices 11a with like parts being indicated by like numerals.

The control system 10 includes a pair of crop height sensing units 30 of the present invention, disposed forwardly of and corresponding to the pair of detasseling devices 11a. The sensing units 30 are suspended by brackets 31 and 32 (FIG. 3) from tubular sleeves or bearings 33 carried on opposite ends of a tubular mounting bar 34. A beam 35 projected forwardly from the upright link 23 of the associated parallel link system 21 supports the mounting bar 34 transversely of the tractor 12 so that the sensing units 30 are moved vertically in correlation with similar movement of the detasseling devices 11. Each sensing unit 30 has a sensor or feeler assembly 37 with a swing arm or rock shaft 38 having stub shafts 39 and 40 (FIG. 4) journaled in the brackets 31 and 32, respectively. A plurality of downwardly depended spaced apart sensor rods 40 are bolted at their upper ends to the swing arm 38 for swinging movement therewith.

Cam housings 44 also form part of the sensing units 30 and are mounted on the brackets 32 for enclosing rotatable switch cams 45 fixed on the shafts 40 for rotational movement therewith. Two micro-switches 46 and 47 are mounted in each of the housings 44 adjacent the periphery of an associated cam 45 for alternate actuation thereby in response to the fore and aft swinging movement of the sensor assembly 37. Referring to FIG. 5, the micro-switch 46 is actuated, when the associated sensor assembly 37 is within a ten degree range of the vertical position therefor, to provide a lowering control for the pair of detasseling devices 11a. The micro-switch 47 is actuated when the sensor assembly 37 is rearwardly pivoted approximately thirty degrees from a vertical position to provide a raise control of the detasseling devices 11a. Thus, there is a twenty degree dead gap range between the raise and lower positions of the sensor assembly 37.

During a detasseling operation, movement of the swing arms 38 of the sensor assemblies 37 is controlled in response to the height of the corn plants being detasseled. The sensor rods 40 of the sensor assemblies 37 are sufficiently spaced apart so that when the pair of detasseling devices 11a are at a proper detasseling height for the height of the corn plants being detasseled, contact of the lower portion of the sensor rods 40 with the upper leaf portions or crown of the corn plants will swing the sensor assemblies 37 rearwardly from a vertical position into the dead gap or band range. Thus, the cam 45 will not actuate either of the switches 46 or 47, and the vertical position of height of the detasseling devices 11a will remain unchanged. However, if short corn plants are encountered during the detasseling operation, the sensor assemblies 37 will move from the dead band range toward a substantially vertical position to actuate the micro-switches 46, to provide a lower control signal. Correspondingly, when tall corn plants are encountered, the sensor assemblies 37 will engage more of the corn plant leafs and will be pivoted rearwardly from the dead band position until the micro-switch 47 is actuated to provide a raise control signal.

The micro-switches 46 and 47 of the two row sensing units 30 form a portion of an electrical control circuit 55 that responds to the control signals from the sensing units 30 to raise or lower the pair of detasseling devices 11a by actuating the hydraulic cylinder 26 for the associated link system 21. The control circuit 55 will respond to a raise control signal from only one of the sensing units 30 to provide a raise adjustment of the pair of detasseling devices 11a relative to the height of the tallest corn plants being encountered by either of the units 30. In contrast, the control circuit 55 will not respond to a lower control signal from only one of the sensing units 30, but must have a lower control signal from both sensing units 30 simultaneously before it will actuate the hydraulic cylinder 26 to lower the pair of detasseling devices 11a relative to the height of the shortest corn plants in both corn rows. This means that the lower control operation of the system 10 is keyed to the tallest corn plants being encountered by either of the units 30. Accordingly, areas devoid of corn plants in the corn row monitored by only one of the sensing units 30, will not actuate the lowering control of the system 10.

In addition to providing automatic depth adjustment of the pair of detasseling devices 11a by means of an automatic circuit branch 56, the electrical control circuit 55 also provides a manual adjust control therefor by means of a manual circuit branch 57 that is connected in parallel with the automatic circuit branch 56. A standard single pole, two position switch 58 is connected in series with a source of electrical power 59, such as the battery of the tractor 12, for alternately connecting either the circuit branch 56 or the branch 57 with the power source 59.

The automatic circuit branch 56 includes a first line 62 with a signal light 63 connected directly to ground to indicate when the circuit 55 is in an automatic mode. A second line 64 is connected in parallel with the line 62 and leads to the raise control micro-switches 46 and the lower control micro-control switches 47.

The micro-switches 47 are connected in parallel with one another so that when either switch 47 is actuated to a closed condition, the line 64 will be connected to three parallel circuit lines 68–70 leading to ground, and containing, respectively, a signal light 72; a solenoid 73 for directing hydraulic fluid to the blind end of the associated hydraulic cylinder 26; and a fluid pump 74 for delivering hydraulic fluid to be directed by the solenoid 73 and a directional diode 75 series connected with the pump 74. Thus, when the control circuit 55 is in the automatic mode and one of the micro-switches 47 is closed, hydraulic fluid will be supplied to the blind end of the associated hydraulic cylinder 26 to raise the pair of detasseling devices 11a.

The micro-switches 46 are connected in a series relation with one another in the circuit branch 56. Thus, only when both switches 46 are closed simultaneously will the line 64 be connected through a directional diode 77 to two parallel lines 78 and 79 that contain, respectively, a signal light 80; and a solenoid 81 for controlling the release of fluid from the blind end of the associated hydraulic cylinder 26. Accordingly, the control circuit 55 will lower the pair of detasseling devices 11a only when the circuit 55 is in the automatic mode with both of the switches 46 closed.

The manual circuit branch 57 includes a first line 84 with a signal light 85 connected to ground to indicate when the circuit is being operated in the manual mode. A second line 86 includes a standard single pole three position toggle switch 87 that in a first actuated position 88 connects the parallel lines 68-70 with the line 86, and in a second actuated position 89 connects the lines 78 and 79 with the line 86. Thus, the manual circuit branch 57 provides a positive raise or lower control of the pair of detasseling devices 11a by entirely bypassing the micro-switches 46 and 47.

As previously stated, the vertical adjustment of the pairs of detasseling devices 11b and 11c is automatically or manually controlled in the same manner as the devices 11a. Accordingly, the control system 10 by use of the crop height sensing units 30 entirely eliminates the need for relying on operator control for making depth adjustments of the detasseling devices 11a–11c, so that efficient and effective removal of corn tassels is achieved.

Although the invention has been described with respect to a preferred embodiment thereof, it is to be understood that it is not to be so limited since changes and modifications can be made therein which are within the full intended scope of this invention as defined by the appended claims.

I claim:

1. In a control system for automatically adjusting the elevation of a mechanical corn detasseling device in response to a sensing of the height of a crop plant having a tassel with adjacent upper leaf portions, wherein the device is adjustably carried on a portable frame for movement along the crop plant row, and wherein said system includes power means for raising and lowering said device and circuit means for actuating said power means in response to the height of the crop plants, the improvement of a crop sensing means comprising:
   (a) a rock shaft means extended transversely of said frame,
   (b) means for rotatably supporting said shaft means on said portable frame forwardly of said device for up and down adjustable movement therewith,
   (c) a plurality of axially spaced dependent sensor rods on said shaft means and rockable therewith in response to contact of the lower portions of the sensor rods with the upper leaf portions of the crop plants, and
   (d) signal means responsive to the rockable movement of said shaft means to produce a sensing signal for operating said circuit means.

2. In a control system according to claim 1 wherein said signal means comprises:
   (a) at least two electrical switch means and
   (b) switch actuating means connected to said rock shaft means for rocking movement therewith to engage at least one of said electrical switch means.

3. In a control system according to claim 2 wherein said switch actuating means includes:
   (a) a cam mounted on one end of said rock shaft means for engaging said one of said switch means when said sensor rods are within a ten degree range from a vertical position and for engaging the other of said switch means when said sensor rods are outside said ten degree range.

* * * * *